United States Patent
Hu et al.

(10) Patent No.: US 11,663,258 B2
(45) Date of Patent: May 30, 2023

(54) METHOD AND APPARATUS FOR PROCESSING DATASET

(71) Applicant: BEIJING BAIDU NETCOM SCIENCE AND TECHNOLOGY CO LTD, Beijing (CN)

(72) Inventors: Zhe Hu, Beijing (CN); Cheng Peng, Beijing (CN); Xuefeng Luo, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 286 days.

(21) Appl. No.: 17/133,869

(22) Filed: Dec. 24, 2020

(65) Prior Publication Data

US 2021/0365444 A1 Nov. 25, 2021

(30) Foreign Application Priority Data

May 20, 2020 (CN) .......................... 202010430339.0

(51) Int. Cl.
*G06F 16/35* (2019.01)
*G06F 16/242* (2019.01)
(Continued)

(52) U.S. Cl.
CPC .......... *G06F 16/35* (2019.01); *G06F 16/2237* (2019.01); *G06F 16/243* (2019.01);
(Continued)

(58) Field of Classification Search
CPC ............... G06F 16/243; G06F 16/2237; G06F 16/24556; G06F 18/2148; G06F 40/284;
(Continued)

(56) References Cited

U.S. PATENT DOCUMENTS

| | | | |
|---|---|---|---|
| 6,173,251 B1 * | 1/2001 | Ito | G06F 16/30 704/7 |
| 2006/0047732 A1 * | 3/2006 | Kudo | G06F 16/93 |

(Continued)

FOREIGN PATENT DOCUMENTS

| | | |
|---|---|---|
| CN | 109992675 A | 7/2019 |
| JP | 2019008779 A | 1/2019 |
| JP | 2019082841 A | 5/2019 |

OTHER PUBLICATIONS

Office Action for Japanese Application No. 2020-216062, dated Jan. 25, 2022, 3 pages.

(Continued)

*Primary Examiner* — Cam Y T Truong
(74) *Attorney, Agent, or Firm* — Lippes Mathias LLP

(57) ABSTRACT

The present disclosure discloses a method and apparatus for processing a dataset. The method includes: obtaining a first text set meeting a preset similarity matching condition with a target text from multiple text blocks provided by a target user; obtaining a second text set from the first text set, in which each text in the second text set does not belong to a same text block as the target text; generating a negative sample set of the target text based on content of a candidate text block to which each text in the second text set belongs; generating a positive sample set of the target text based on content of a target text block to which the target text belongs; and generating a dataset of the target user based on the negative sample set and the positive sample set, and training a matching model based on the dataset.

20 Claims, 5 Drawing Sheets

(51) Int. Cl.
    *G06F 16/22*     (2019.01)
    *G06F 16/2455*   (2019.01)
    *G06V 30/414*    (2022.01)
    *G06F 18/214*    (2023.01)

(52) U.S. Cl.
    CPC .... *G06F 16/24556* (2019.01); *G06F 18/2148* (2023.01); *G06V 30/414* (2022.01)

(58) Field of Classification Search
    CPC ........ G06F 40/30; G06F 16/35; G06F 16/332; G06F 16/355; G06F 18/214; G06F 18/22; G06F 40/289; G06F 16/3347; G06V 30/414; G06N 5/00; G06N 5/02; G06N 20/00
    See application file for complete search history.

(56)         References Cited

U.S. PATENT DOCUMENTS

| 2017/0132516 A1* | 5/2017  | Zhang ................. G06Q 30/0202 |
| 2019/0361849 A1* | 11/2019 | Rogynskyy ......... G06F 11/3024 |
| 2020/0193153 A1* | 6/2020  | Lee ...................... G06V 30/418 |
| 2020/0210648 A1* | 7/2020  | Comeau .............. G06F 16/3331 |
| 2021/0182496 A1* | 6/2021  | Shi ......................... G06N 20/00 |

OTHER PUBLICATIONS

Extended European Search Report for Application No. 20217361.3, dated Jun. 4, 2021, 8 pages.

\* cited by examiner

| text block 1 | "I want to apply for a credit card"; <br> "How can I apply for a credit card"; <br> "Apply for a credit card"; <br> ...... |
|---|---|
| text block 2 | "Check my credit card bill"; <br> ""How much is my credit card bill left"; <br> "Check a credit card bill"; <br> ...... |

METHOD AND APPARATUS FOR PROCESSING DATASET

CROSS-REFERENCE TO RELATED APPLICATION

This application claims priority to and benefits of Chinese Patent Application Serial No. 202010430339.0, filed on May 20, 2020, the entire content of which is incorporated herein by reference.

FIELD

The present disclosure relates to a field of natural language processing in a data processing field, more particularly to a method and an apparatus for processing a dataset, an electronic device, and a storage medium.

BACKGROUND

Generally, when a user inputs a query statement, a retrieval system is used to retrieve multiple similar questions in a database, and then these candidate items are reordered by a more accurate and flexible model to obtain a final answer.

In the above reordering procedure, a semantic similarity between two texts is calculated by a similarity matching model. For example, when the user enters a query statement "I want to apply for a credit card", the similarity matching model needs to accurately match to a statement "how can I apply for a credit card" in candidate items. Therefore, large-scale and high-quality training data needs to be trained to generate the similarity matching model.

In the related art, different semantic texts are randomly selected as negative samples in a training dataset. The way for generating the negative samples is relatively simple and inaccurate.

SUMMARY

A first aspect of embodiments of the present disclosure provides a method for processing a dataset. The method includes: obtaining a plurality of text blocks provided by a target user, each text block including a plurality of texts with similar semantics, and obtaining a first text set meeting a preset similarity matching condition with a target text from the plurality of text blocks; obtaining a second text set from the first text set, in which, each text in the second text set does not belong to a same text block as the target text; generating a negative sample set of the target text based on content of a candidate text block to which each text in the second text set belongs; generating a positive sample set of the target text based on content of a target text block to which the target text belongs; and generating a dataset of the target user based on the negative sample set and the positive sample set, and training a matching model based on the dataset for recognizing a text similarity.

A second aspect of embodiments of the present disclosure provides an apparatus for processing a dataset. The apparatus includes a processor and a memory. The memory is configured to store instructions executable by the processor. The processor is configured to implement the method described in the first aspect by executing the instructions stored in the memory.

A third aspect of embodiments of the present disclosure provides an electronic device. The electronic device includes: at least one processor and a memory. The memory is communicatively coupled to the at least one processor. The memory is configured to store instructions executable by the at least one processor. When the instructions are executed by the at least one processor, the at least one processor is caused to implement the method for processing the dataset according to the first aspect of embodiments.

A fourth aspect of embodiments of the present disclosure provides a non-transitory computer readable storage medium having computer instructions stored thereon. The computer instructions are configured to enable the computer to execute the method for processing the dataset according to the first aspect of embodiments.

It should be understood that, contents described in this section are not intended to identify key or important features of embodiments of the present disclosure, nor is it intended to limit the scope of the present disclosure. Other features of the present disclosure may become apparent from the following description.

BRIEF DESCRIPTION OF THE DRAWINGS

The accompanying drawings are used for better understanding the solution and do not constitute a limitation of the present disclosure.

DETAILED DESCRIPTION

Description will be made below to exemplary embodiments of the present disclosure with reference to accompanying drawings, which includes various details of embodiments of the present disclosure to facilitate understanding and should be regarded as merely examples. Therefore, it should be recognized by the skilled in the art that various changes and modifications may be made to the embodiments described herein without departing from the scope and spirit of the present disclosure. Meanwhile, for clarity and conciseness, description for well-known functions and structures is omitted in the following description.

Description will be made below to a method and apparatus for processing a dataset, an electronic device, and a storage medium with reference to accompanying drawings.

Figures 1, 2:
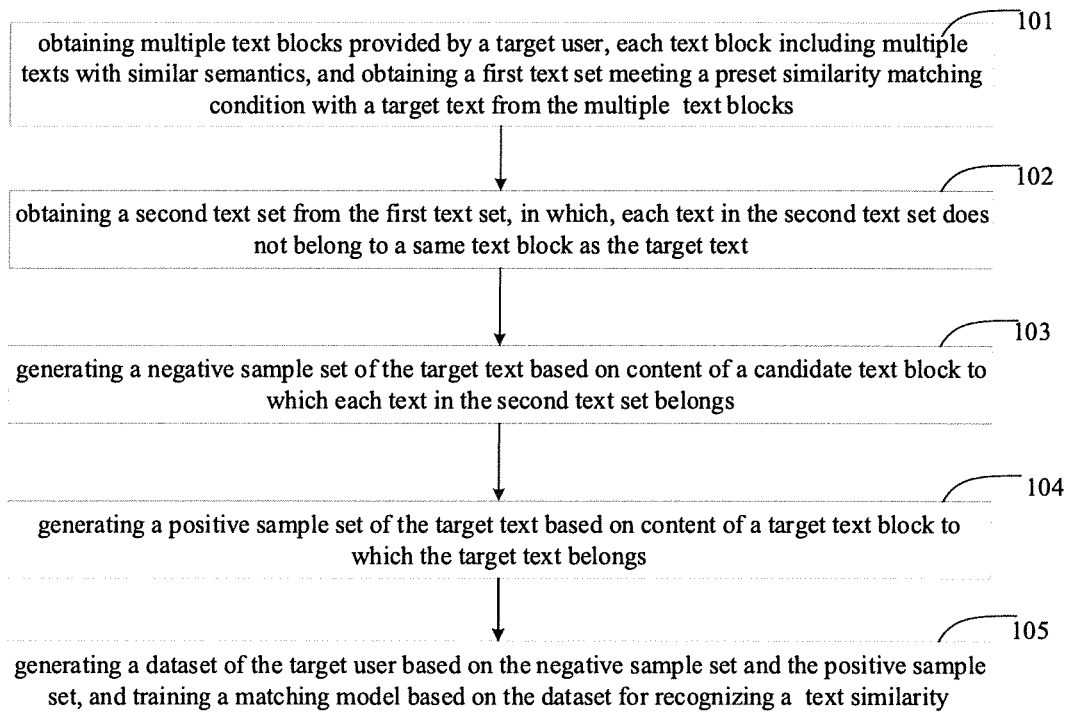
FIG. 1 is a flow chart illustrating a method for processing a dataset according to a first embodiment of the present disclosure.
FIG. 2 is a schematic diagram illustrating text blocks according to embodiments of the present disclosure.

FIG. 1 is a flow chart illustrating a method for processing a dataset according to a first embodiment of the present disclosure.

In detail, in the related art, texts with different semantics are randomly selected as negative samples in a training dataset. The way for generating the negative samples is relatively simple and inaccurate.

The present disclosure provides a method for processing a dataset. Multiple text blocks provided by a target user are obtained. Each text block includes multiple texts with similar semantics. A first text set meeting a preset similarity matching condition with a target text from the multiple text blocks is obtained. A second text set is obtained from the first text set. Each text in the second text set does not belong to a same text block as the target text. A negative sample set of the target text is generated based on content of a candidate text block to which each text in the second text set belongs. A positive sample set of the target text is generated based on content of a target text block to which the target text belongs. A dataset of the target user is generated based on the negative sample set and the positive sample set. A matching model is trained based on the dataset to recognize a text similarity.

In this way, the technical problem of false samples and simple data in random sampling is avoided. After the text sets are matched by the similarity matching condition, the positive sample set and the negative sample set are obtained for generating the dataset, thereby improving the validity of the dataset and the robustness of the matching model.

As illustrated in FIG. 1, the method for processing the dataset may includes the following.

At block 101, multiple text blocks provided by a target user are obtained. Each text block includes multiple texts with similar semantics. A first text set meeting a preset similarity matching condition with a target text is obtained from the multiple text blocks.

With the present disclosure, by obtaining the dataset of the target user, the matching model is trained for recognizing the text similarity, thereby improving the accuracy and stability of the matching model. The target user may include one or more sub-users. In the present disclosure, one or more sub-users may be determined as the target user based on application scenes in different fields.

For example, in a banking field, there are differences among query texts in different banking institutions, and the target user includes multiple sub-users, i.e., multiple banking institutions. For another example, in an education field, there is little difference among query texts in different educational institutions. In order to improve training efficiency, the target user includes one sub-user, i.e., one educational institution. The target user may be selected and set based on an actual application requirement.

In detail, the multiple text blocks provided by the target user are obtained, and each text block includes the multiple texts with similar semantics. In other words, the text data includes a series of text blocks having the texts with similar semantics, and the texts in respective text blocks have the same semantics. For example, as illustrated in FIG. 2, a text "I want to apply for a credit card" and a text "How can I apply for a credit card" are in a same text block 1. A text "Check my credit card bill" and a text "How much is my credit card bill left" are in a same text block 2.

It could be understood that, the texts in respective text blocks have similar semantics. When another text is randomly sampled from another text block having a different semantic from the text block as the negative sample, and the two texts are considered to have different semantic similarities by default, some inaccurate negative samples may be easily sampled by such a method.

For example, the text "I want to apply for a card" and the text "I want to apply for a credit card" are two texts with similar semantics; the text "I want to apply for a card" and the text "I want to apply for a deposit card" are two texts with different semantics. The two texts "I want to apply for a card" and "I want to apply for a deposit card" belong to different text blocks, but they are likely to have similar semantics to a certain extent. In this case, such negative samples may have a great impact on the accuracy of the matching model, and the negative samples generated by random sampling are relatively simple, such that the matching model may not learn enough accurate knowledge, and the fine granularity and accuracy of the matching model are also affected.

Therefore, the first text set meeting the preset similarity matching condition with the target text needs to be further obtained from the multiple text blocks. There may be one or more preset similarity matching conditions.

For example, in order to select samples with similar expressions and different semantic information as the negative samples, a high word duplication between two texts is taken as the preset similarity matching condition. For another example, a high semantic similarity between two texts is taken as the preset similarity matching condition. The preset similarity matching condition may be selected and set based on an actual application requirement. Examples are as follows.

In a first example, word segmentation is performed on the target text to generate a first word segmentation set, and word segmentation is performed on respective texts in the multiple text blocks to generate multiple second word segmentation sets. The first word segmentation set is compared with each of the multiple second word segmentation sets to obtain a word segmentation duplication between the first word segmentation set and each of the multiple second word segmentation sets. The word segmentation duplication between the first word segmentation set and each of the multiple second word segmentation sets is compared with a preset threshold, and the first text set is generated based on the second word segmentation sets corresponding to word segmentation duplications greater than the preset threshold.

In a second example, a sub-vector, a text vector and a position vector corresponding to the target text are obtained. The sub-vector, the text vector and the position vector corresponding to the target text are inputted into a preset training language representation model to obtain a target statement vector. A sub-vector, a text vector and a position vector corresponding to each text in the multiple text blocks are obtained. The sub-vector, the text vector and the position vector corresponding to each text are inputted into the preset training language representation model to obtain a statement vector corresponding to each text. A cosine similarity between the target statement vector and the statement vector corresponding to each text is calculated. The cosine similarity is compared with a preset cosine threshold. The first text set is generated based on texts corresponding to the cosine similarities greater than the preset cosine threshold.

It should be noted that, each text in the multiple text blocks may be used as the target text for dataset construction (i.e., traversing each text). Alternatively, some texts in the multiple text blocks may be used as the target text for the dataset construction. The target text is selected and set based on an actual application scene, thereby ensuring the accuracy of a trained model and improving the training efficiency.

At block 102, a second text set is obtained from the first text set. Each text in the second text set does not belong to a same text block as the target text.

At block 103, a negative sample set of the target text is generated based on content of a candidate text block to which each text in the second text set belongs.

In detail, respective texts in the first text set meeting the preset similarity matching condition belong to multiple text blocks. The second text set where each text does not belong to the same text block as the target text needs to be obtained from the first text set, which may be selected and set based on an application scene. Examples are as follows.

As an example, a block identifier corresponding to the target text is obtained. A block identifier corresponding to each text in the first text set is obtained. The block identifier corresponding to each text is compared with the block identifier corresponding to the target text. The second text set is generated based on one or more texts having inconsistent block identifiers with the target text.

Then, the negative sample set of the target text is generated based on the content of the candidate text block to which each text in the second text set belongs. As a possible implementation, the content of the candidate text block to which each text in the second text set belongs is obtained. Text combination is performed on multiple texts in each candidate text block to generate a first negative sample set. Text combination is performed on multiple texts in different candidate text blocks to generate a second negative sample set. The negative sample set of the target text is generated based on the first negative sample set and the second negative sample set.

At block 104, a positive sample set of the target text is generated based on content of a target text block to which the target text belongs.

In detail, the target text has a text block identifier. The target text block may be determined based on the text block identifier, and the content of the target text block may be further obtained. In other words, text combination is performed on multiple texts in the target text block to generate the positive sample set of the target text.

Certainly, after the multiple texts in the target text block are obtained, the positive sample set of the target text may be generated based on part of the multiple texts matching the second text set.

At block 105, a dataset of the target user is generated based on the negative sample set and the positive sample set, and a matching model is trained based on the dataset for recognizing a text similarity.

In detail, in an application scene where the target user includes one sub-user, the dataset of the target user may be generated based on the negative sample set and the positive sample set. In an application scene where the target user includes multiple sub-users, multiple text blocks provided by each sub-user need to be obtained. A sub-dataset corresponding to each sub-user is generated based on the negative sample set and the positive sample set. The sub-datasets corresponding to respective sub-users are combined to generate a candidate dataset, and deduplication processing is performed on the candidate dataset based on a preset deduplication strategy to generate the dataset of the target user. In this way, the universality and applicability of the dataset may be improved, and a good result may be achieved in task dialogue in a specific field.

There are multiple ways for training the matching model based on the dataset for recognizing the text similarity, which may be selected and set based on a requirement. Examples are as follows.

In a first example, a first query statement and a second query statement are obtained. The first query statement is encoded to generate a first query vector. The second query statement is encoded to generate a second query vector. The first query vector and the second query vector are inputted to the matching model to obtain a matching type outputted. The text similarity between the first query statement and the second query statement is determined based on the matching type.

For example, the first query vector is inputted into the matching model to output a matching type 1, and the second query vector is inputted the matching model to output a matching type 2. The matching type 1 is different from the matching type 2. It is determined that the first query statement is not similar with the second query statement. For another example, the first query vector is inputted into the matching model to output the matching type 1, and the second query vector is inputted the matching model to output the matching type 1. The matching type 1 is the same as the matching type 1. It is determined that the first query statement is similar with the second query statement.

In a second example, a first query statement and a second query statement are obtained. The first query statement and the second query statement are inputted to the matching model for statement alignment to obtain an alignment result. The text similarity between the first query statement and the second query statement is determined based on the alignment result.

For example, when the first query statement and the second query statement are inputted into the matching model for the statement alignment, and an alignment ratio of 95%, which is greater than a preset threshold value 90%, is obtained, it is determined that the first query statement is similar with the second query statement; otherwise, it is determined that the first query statement is different from the second query statement.

With the method for processing the dataset according to embodiments of the present disclosure, the multiple text blocks provided by the target user are obtained. Each text block includes the multiple texts with similar semantics. The first text set meeting the preset similarity matching condition with the target text is obtained from the multiple text blocks. The second text set where each text does not belong to the same text block as the target text is obtained from the first text set. The negative sample set of the target text is generated based on the content of the text block to which each text in the second text set belongs. The positive sample set of the target text is generated based on the content of the target text block to which the target text belongs. The dataset of the target user is generated based on the negative sample set and the positive sample set. The matching model is trained based on the dataset for recognizing the text similarity. In this way, the technical problem of false samples and simple data in random sampling is avoided. After the text set is obtained by the similarity matching condition, the positive sample set and the negative sample set are obtained for generating the dataset, thereby improving the validity of the dataset and the robustness of the matching model.

Based on the description of the above embodiments, it may be understood that the first text sets obtained based on different preset similarity matching conditions are different, and thus the finally constructed datasets are also different. For the skilled in the art more clearly knowing how to obtain the first text set meeting the preset similarity matching condition with the target text, description will be made below in detail with reference to FIG. 3 and FIG. 4, taking calculation and matching based on word frequency statistics and based on vectors of statements as examples.

Figure 3:
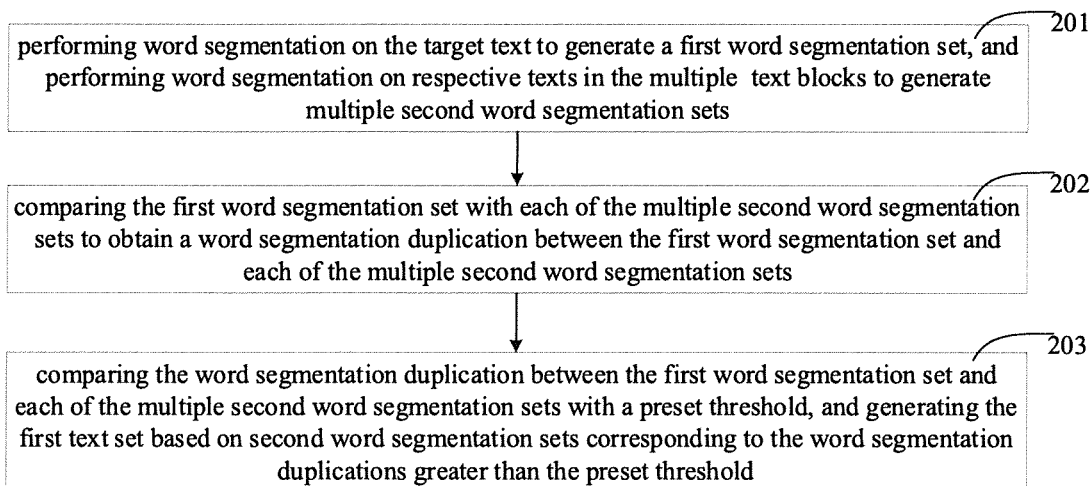
FIG. 3 is a flow chart illustrating a method for processing a dataset according to a second embodiment of the present disclosure.

In detail, as illustrated in FIG. 3, after the action at block 101, the method also includes the following.

At block 201, word segmentation is performed on the target text to generate a first word segmentation set, and word segmentation is performed on respective texts in the multiple text blocks to generate multiple second word segmentation sets.

At block 202, the first word segmentation set is compared with each of the multiple second word segmentation sets to obtain a word segmentation duplication between the first word segmentation set and each of the multiple second word segmentation sets.

At block 203, the word segmentation duplication between the first word segmentation set and each of the multiple second word segmentation sets is compared with a preset threshold, and the first text set is generated based on second word segmentation sets corresponding to the word segmentation duplications greater than the preset threshold.

In detail, word segmentation is performed on the target text by a preset segmentation algorithm to generate the first segmentation set. That is, the first word segmentation set includes one or more segmented words corresponding to the target text. Word segmentation is performed on respective texts in the multiple text blocks by the preset segmentation algorithm to generate the multiple second word segmentation sets.

Further, the first word segmentation set is compared with each of the multiple second word segmentation sets to obtain the word segmentation duplication between the first word segmentation set and each of the multiple second word segmentation sets. In other words, a word duplication condition between the target text and each text in the multiple text blocks may be quickly understood by the word segmentation duplication, and further the first text set is generated based on the second word segmentation sets corresponding to the word segmentation duplications greater than the preset threshold are.

In other words, for each text in the multiple text blocks, only when the number of words overlapped between the target text and the text is greater than a certain threshold, the text is determined as the text in the first text set. In this way, texts having similar expressions and different semantic information are selected. For example, the text "I want to apply for a credit card" and the text "I want to apply for a deposit card" have similar expressions, but have different semantic information. These texts may be used as training samples to enable the matching model to distinguish the difference between the semantic information and the expression of the text better.

Figure 4:
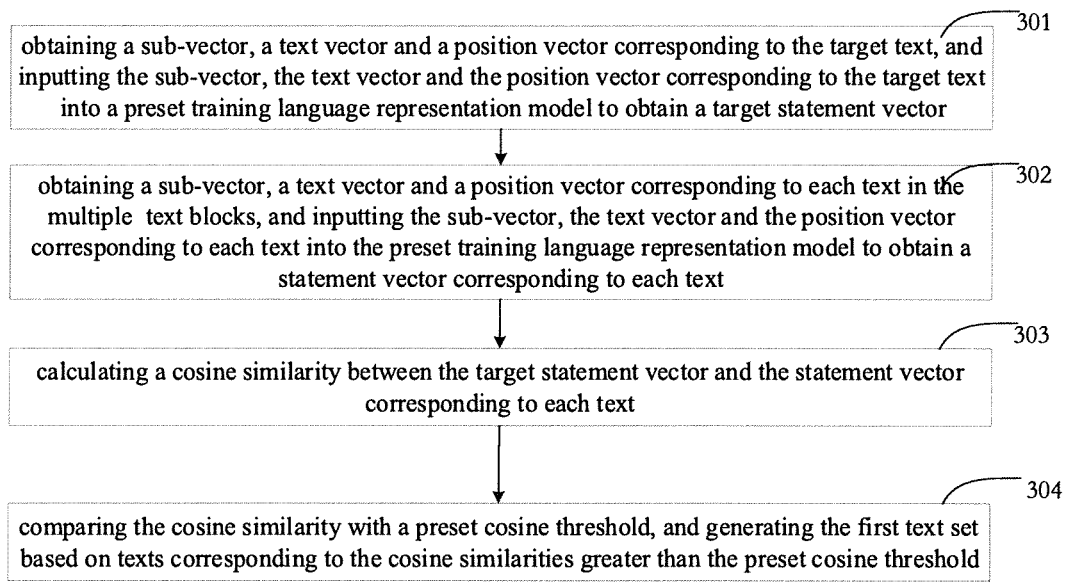
FIG. 4 is a flow chart illustrating a method for processing a dataset according to a third embodiment of the present disclosure.

In detail, as illustrated in FIG. 4, after the action at block 101, the method also includes the following.

At block 301, a sub-vector, a text vector and a position vector corresponding to the target text are obtained. The sub-vector, the text vector and the position vector corresponding to the target text are inputted into a preset training language representation model to obtain a target statement vector.

At block 302, a sub-vector, a text vector and a position vector corresponding to each text in the multiple text blocks are obtained. The sub-vector, the text vector and the position vector corresponding to each text are inputted into the preset training language representation model to obtain a statement vector corresponding to each text.

At block 303, a cosine similarity between the target statement vector and the statement vector corresponding to each text is calculated.

At block 304, the cosine similarity is compared with a preset cosine threshold, and the first text set is generated based on texts corresponding to the cosine similarities greater than the preset cosine threshold.

In detail, in order to further improve the stability of the matching model, in addition to the texts obtained based on the embodiment illustrated as FIG. 3, texts obtained based on the semantic similarities may be added to the first text set. In this way, texts with a certain semantic similarity but different contents, such as the text "I want to apply for a credit card" and the text "What is the limit of the credit card I just applied for", are selected. These texts may be used as the training samples to enable the matching model to learn more fine-grained texts and distinguish the texts with the similar semantics more accurately.

In detail, the sub-vector, the text vector and the position vector corresponding to the target text are obtained. The sub-vector, the text vector and the position vector corresponding to the target text are inputted the preset training language representation model to obtain the target statement vector. The cosine similarities between the target statement vector and the statement vectors corresponding to respective texts are calculated, and the first text set is generated based on the texts corresponding to the cosine similarities greater than the preset cosine threshold. Text samples may be trained in advance by employing a cyclic neural network or a convolutional neural network.

A context relationship of the whole text may be better characterized by using the preset training language representation model, instead of that each word is taken as an independent part. For example, semantic of the word "apple" in a semantic environment related to fruits is completely different from that in a semantic environment related to mobile phones. In the present disclosure, a word order and a dependency relationship of words in the text are considered, and the context of the whole text is trained, thereby improving the accuracy of the semantic similarity calculation, and improving the recognition result of the matching model.

Based on the description of the above embodiments, it may also be understood that, the number of texts in the first text set meeting the preset similarity matching condition with the target text is not necessarily the same as a preset number threshold of the dataset constructed in the present disclosure. Therefore, the texts need to be further selected to improve the training efficiency.

Figure 5:
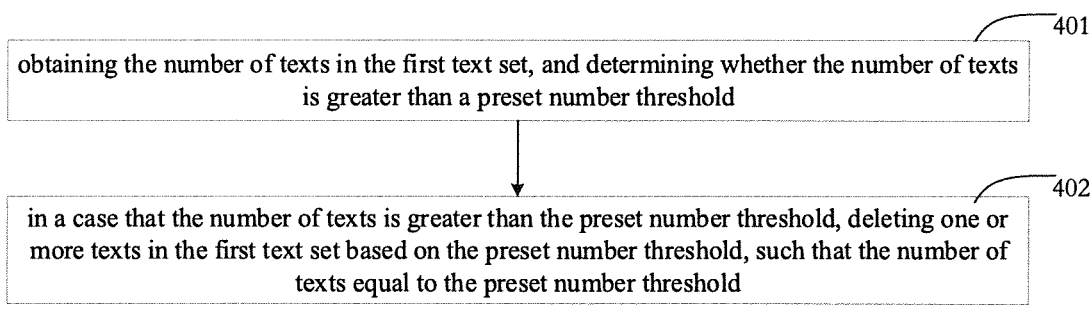
FIG. 5 is a flow chart illustrating a method for processing a dataset according to a fourth embodiment of the present disclosure.

In detail, as illustrated in FIG. 5, after the action at block 101, the method also includes the following.

At block 401, the number of texts in the first text set is obtained, and it is determined whether the number of texts is greater than a preset number threshold.

At block 402, in a case that the number of texts is greater than the preset number threshold, one or more texts in the first text set are deleted based on the preset number threshold, such that the number of texts is equal to the preset number threshold.

In a practical application, different number thresholds may be set based on different application scenes, that is, the number of texts selected as the training samples is based on the application scene. Therefore, the number of texts in the first text set is obtained, and it is determined whether the number of texts is greater than the preset number threshold. In the case that the number of texts is greater than the preset number threshold, the one or more texts in the first text set are deleted based on the preset number threshold, such that the number of texts is equal to the preset number threshold. The deleting processing may be random deletion, which further improves the randomness of the training samples.

Figure 6:
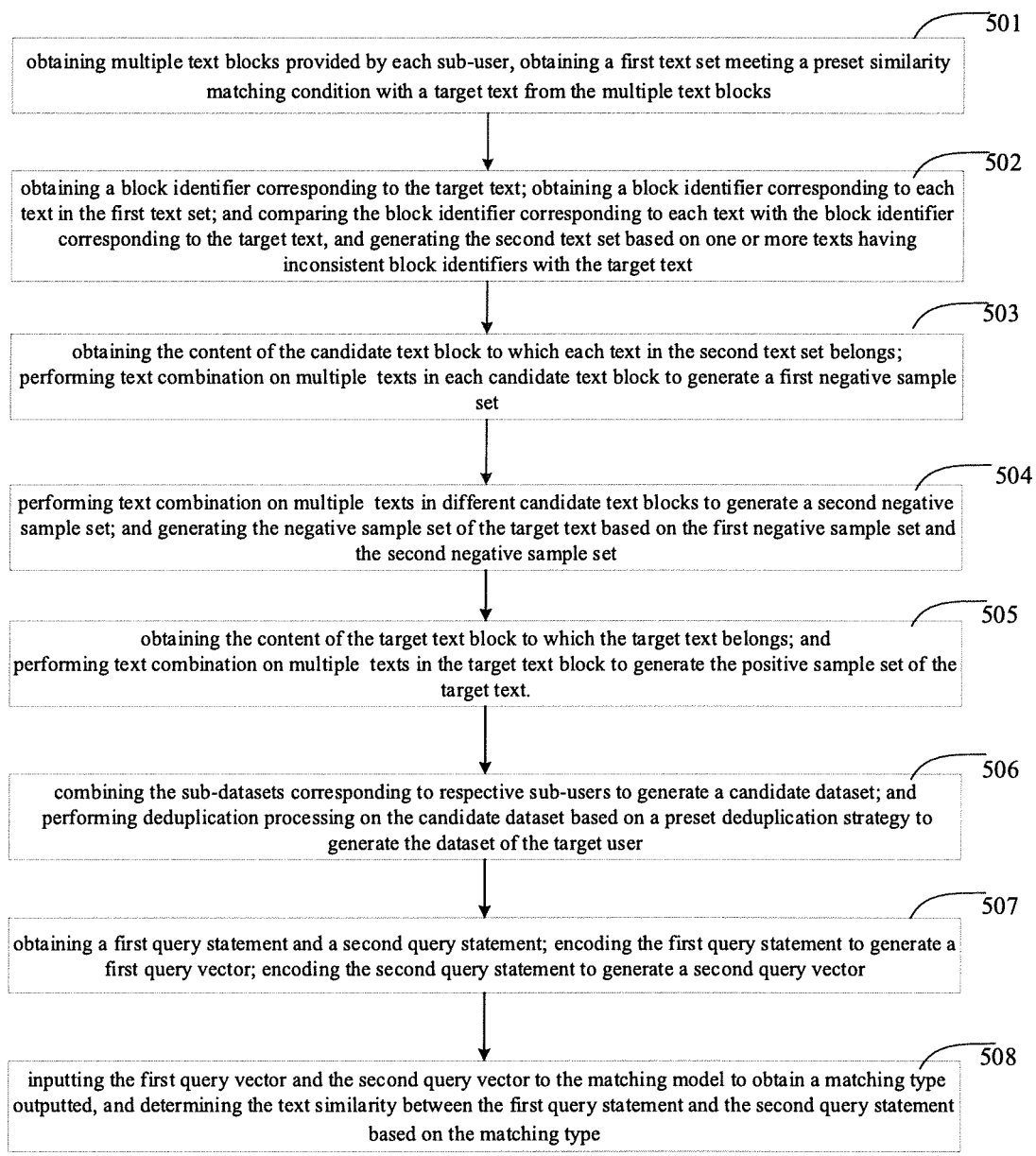
FIG. 6 is a flow chart illustrating a method for processing a dataset according to a fifth embodiment of the present disclosure.

FIG. 6 is a flow chart illustrating a method for processing a dataset according to a fifth embodiment of the present disclosure.

At block 501, multiple text blocks provided by each sub-user are obtained, and a first text set meeting a preset similarity matching condition with a target text is obtained from the multiple text blocks.

In detail, in embodiments, for the application scene where the target user includes multiple sub-users, in order to improve the universality of the dataset, the sub-datasets corresponding to respective sub-users may need to be combined to generate the candidate dataset, and then deduplication processing is performed on the candidate dataset based on a preset deduplication strategy to generate the dataset of target user.

In detail, the multiple text blocks provided by each sub-user are obtained. The first text set meeting the preset similarity matching condition with the target text is obtained from the multiple text blocks. There may be one or more preset similarity matching conditions. For example, in order to select samples with similar expressions and different semantic information as the negative samples, a high word duplication between two texts is taken as the preset similarity matching condition. For another example, a high semantic similarity between two texts is taken as the preset similarity matching condition. The preset similarity matching condition may be selected and set based on an actual application requirement.

At block 502, a block identifier corresponding to the target text is obtained. A block identifier corresponding to each text in the first text set is obtained. The block identifier corresponding to each text is compared with the block identifier corresponding to the target text. The second text set is generated based on one or more texts having inconsistent block identifiers with the target text.

It could be understood that, the target text has the block identifier, the block identifier corresponding to each text in the first text set is obtained, and the block identifier corresponding to each text is compared with the block identifier corresponding to the target text. For example, a block identifier 01 of the target text is consistent with a block identifier corresponding to a text 1, and the block identifier 01 of the target text is inconsistent with a block identifier 02 corresponding to a text 2, and thus it is determined that the text 2 is stored in the second text set.

At block 503, the content of the candidate text block to which each text in the second text set belongs is obtained, and text combination is performed on multiple texts in each candidate text block to generate a first negative sample set.

At block 504, text combination is performed on multiple texts in different candidate text blocks to generate a second negative sample set, and the negative sample set of the target text is generated based on the first negative sample set and the second negative sample set.

In detail, the texts in the second text set may belong to the same or different text blocks. The multiple candidate text blocks are determined based on the block identifiers of texts in the second text set. The multiple texts in each candidate text block are combined to generate the first negative sample set. Further, the multiple texts in different candidate text blocks are further combined to generate the second negative sample set. The negative sample set of the target text is generated based on the first negative sample set and the second negative sample set.

The multiple texts in each candidate text block are combined to generate the first negative sample set, and the multiple texts in different candidate text blocks are combined to generate the second negative sample set, and finally the negative sample set of the target text is generated, which further improves the randomness of the texts, thereby improving the randomness of the training samples and the recognition accuracy of the matching model.

At block 505, the content of the target text block to which the target text belongs is obtained, and text combination is performed on multiple texts in the target text block to generate the positive sample set of the target text.

In detail, the target text has the text block identifier. The target text block may be determined based on the text block identifier. The content of the target text block, i.e., the multiple texts in the target text block, may be further obtained. The positive sample set of the target text may be generated by combining the multiple texts in the target text block.

Certainly, after the multiple texts in the target text block are obtained, the positive sample set of the target text may also be generated based on part of the multiple texts matching the second text set.

At block 506, the sub-datasets corresponding to respective sub-users are combined to generate a candidate dataset, and deduplication processing is performed on the candidate dataset based on a preset deduplication strategy to generate the dataset of the target user.

In detail, the sub-datasets corresponding to respective sub-users are combined to generate the candidate dataset, and deduplication processing is further performed on the candidate dataset based on the preset deduplication strategy to generate the dataset of the target user. The preset deduplication strategy may be selected based on requirements of different application scenes. For example, the duplication of respective texts in the candidate dataset may be directly detected, and the repeated texts may be deleted to generate the dataset of the target user, thereby reducing sample noise and improving the accuracy of the matching model.

At block 507, a first query statement and a second query statement are obtained, the first query statement is encoded to generate a first query vector, and the second query statement is encoded to generate a second query vector.

At block 508, the first query vector and the second query vector are inputted to the matching model to obtain a matching type outputted, and the text similarity between the first query statement and the second query statement is determined based on the matching type.

In detail, the first query statement and the second query statement are obtained, the first query statement is encoded to generate the first query vector, and the second query statement is encoded to generate the second query vector. Further, the first query vector and the second query vector are inputted to the matching model to obtain the matching type outputted. Finally, the text similarity between the first query statement and the second query statement is determined based on the matching type.

For example, the first query vector is inputted into the matching model to obtain an outputted matching type 1, the second query vector is inputted into the matching model to obtain an outputted matching type 2, and the matching type 1 is different from the matching type 2. Then, it is determined that the first query statement is not similar with the second query statement. For another example, the first query vector is inputted into the matching model to obtain the outputted matching type 1, the second query vector is inputted into the matching model to obtain the outputted matching type 1, and the matching type 1 is the same as the matching type 1. Then, it is determined that the first query statement is similar with the second query statement.

The multiple text blocks provided by each sub-user are obtained. A first text set meeting the preset similarity matching condition with the target text is obtained from the multiple text blocks. The block identifier corresponding to the target text is obtained. The block identifier corresponding to each text in the first text set is obtained. The block identifier corresponding to each text is compared with the block identifier corresponding to the target text. The second text set is generated based on the one or more texts having inconsistent block identifiers with the target text. The content of the candidate text block to which each text in the second text set belongs is obtained. Text combination is performed on the multiple texts in each candidate text block to generate the first negative sample set. Text combination is performed on the multiple texts in different candidate text blocks to generate the second negative sample set. The negative sample set of the target text is generated based on the first negative sample set and the second negative sample set. The content of the target text block to which the target text belongs is obtained. Text combination is performed on the multiple texts in the target text block to generate the positive sample set of the target text. The sub-datasets corresponding to respective sub-users are combined to generate the candidate dataset, and deduplication processing is performed on the candidate dataset based on the preset deduplication strategy to generate the dataset of the target user. The first query statement and the second query statement are obtained. The first query statement is encoded to generate the first query vector. The second query statement is encoded to generate the second query vector. The first query vector and the second query vector are inputted to the matching model to obtain the matching type outputted. The text similarity between the first query statement and the second query statement is determined based on the matching type. Merging and deduplication processing are performed on the sub-datasets after the sub-datasets of respective sub-users are constructed. All the sub-datasets are merged together as a general dataset of the target user, which has better universality in the fields and effectively solves the problem of false samples and simple data in random sampling, such that the training model has better robustness.

To achieve the above embodiments, the present disclosure provides an apparatus for processing a dataset.

Figure 7:
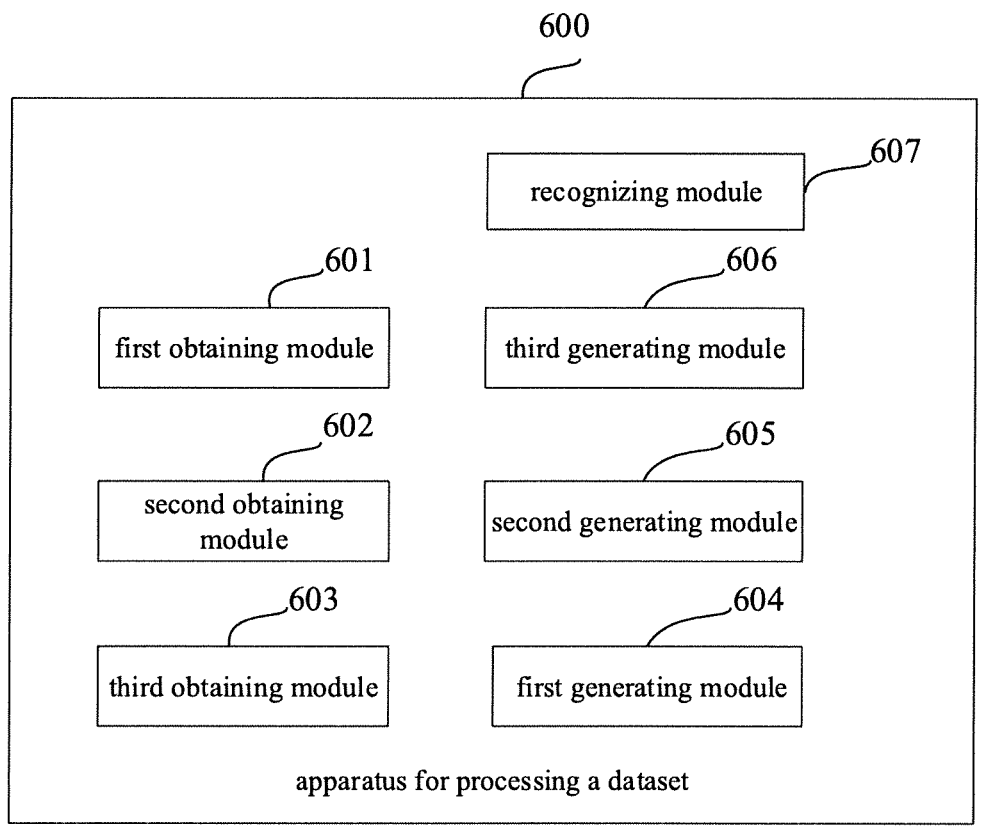
FIG. 7 is a block diagram illustrating an apparatus for processing a dataset according to a sixth embodiment of the present disclosure.

FIG. 7 is a block diagram illustrating an apparatus for processing a dataset according to a sixth embodiment of the present disclosure.

As illustrated in FIG. 7, the apparatus 600 for processing the dataset may include: a first obtaining module 601, a second obtaining module 602, a third obtaining module 603, a first generating module 604, a second generating module 605, a third generating module 606, and a recognizing module 607.

The first obtaining module 601 is configured to obtain multiple text blocks provided by a target user. Each text block includes multiple texts with similar semantics.

The second obtaining module 602 is configured to obtain a first text set meeting a preset similarity matching condition with a target text from the multiple text blocks.

The third obtaining module 603 is configured to obtain a second text set from the first text set. Each text in the second text set does not belong to a same text block as the target text.

The first generating module 604 is configured to generate a negative sample set of the target text based on content of a candidate text block to which each text in the second text set belongs.

The second generating module 605 is configured to generate a positive sample set of the target text based on content of a target text block to which the target text belongs.

The third generating module 606 is configured to generate a dataset of the target user based on the negative sample set and the positive sample set.

The recognizing module 607 is configured to train a matching model based on the dataset for recognizing a text similarity.

As a possible implementation, the second obtaining module 602 is configured to: perform word segmentation on the target text to generate a first word segmentation set, and perform word segmentation on respective texts in the multiple text blocks to generate multiple second word segmentation sets; compare the first word segmentation set with each of the multiple second word segmentation sets to obtain a word segmentation duplication between the first word segmentation set and each of the multiple second word segmentation sets; and compare the word segmentation duplication between the first word segmentation set and each of the multiple second word segmentation sets with a preset threshold, and generate the first text set based on second word segmentation sets corresponding to the word segmentation duplications greater than the preset threshold.

As a possible implementation, the second obtaining module 602 is configured to: obtain a sub-vector, a text vector and a position vector corresponding to the target text, and input the sub-vector, the text vector and the position vector corresponding to the target text into a preset training language representation model to obtain a target statement vector; obtain a sub-vector, a text vector and a position vector corresponding to each text in the multiple text blocks, and input the sub-vector, the text vector and the position vector corresponding to each text into the preset training language representation model to obtain a statement vector corresponding to each text; calculate a cosine similarity between the target statement vector and the statement vector corresponding to each text; and compare the cosine similarity with a preset cosine threshold, and generate the first text set based on texts corresponding to the cosine similarities greater than the preset cosine threshold.

Figure 8:
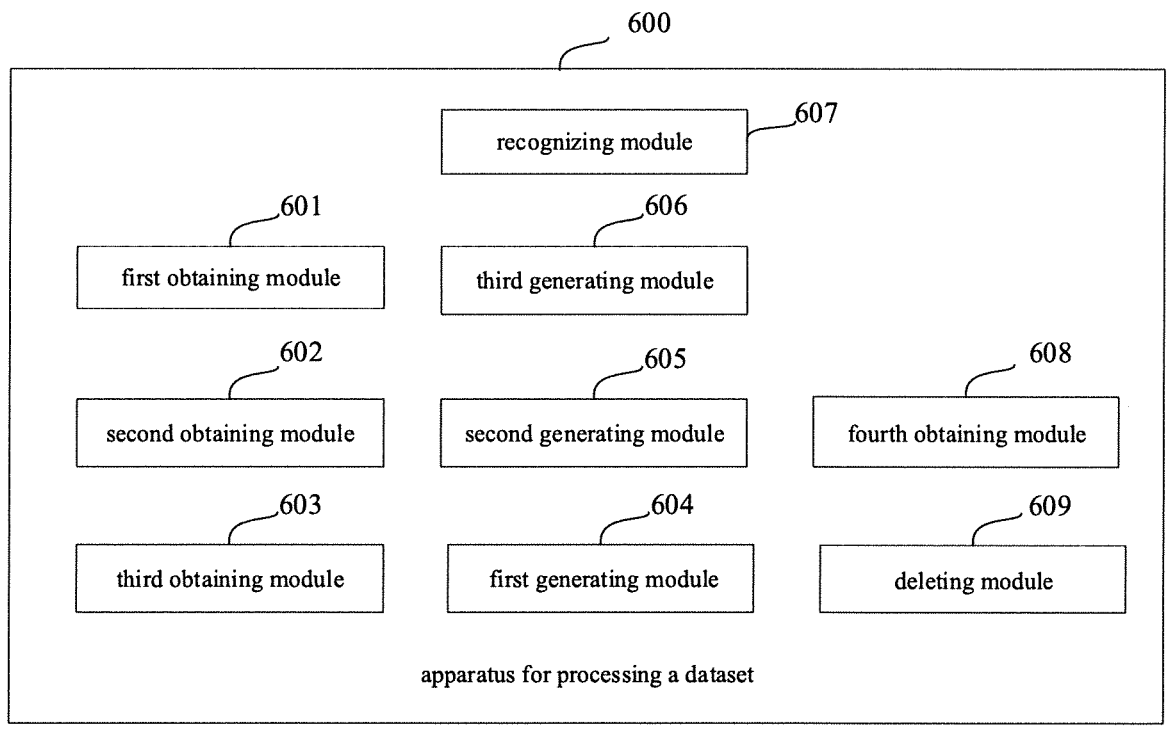
FIG. 8 is a block diagram illustrating an apparatus for processing a dataset according to a seventh embodiment of the present disclosure.

As a possible implementation, as illustrated in FIG. 8, on the basis of FIG. 7, the apparatus also includes: a fourth obtaining module 608 and a deleting module 609.

The fourth obtaining module 608 is configured to obtain the number of texts in the first text set, and to determine whether the number of texts is greater than a preset number threshold.

The deleting module 609 is configured to, in a case that the number of texts is greater than the preset number threshold, delete one or more texts in the first text set based on the preset number threshold, such that the number of texts equal to the preset number threshold.

As a possible implementation, the third obtaining module 603 is configured to: obtain a block identifier corresponding to the target text; obtain a block identifier corresponding to each text in the first text set; and compare the block identifier corresponding to each text with the block identifier corresponding to the target text, and generate the second text set based on one or more texts having inconsistent block identifiers with the target text.

As a possible implementation, the first generating module 604 is configured to: obtain the content of the candidate text block to which each text in the second text set belongs; perform text combination on multiple texts in each candidate text block to generate a first negative sample set; perform text combination on multiple texts in different candidate text blocks to generate a second negative sample set; and generate the negative sample set of the target text based on the first negative sample set and the second negative sample set.

As a possible implementation, the second generating module 605 is configured to: obtain the content of the target text block to which the target text belongs; and perform text combination on multiple texts in the target text block to generate the positive sample set of the target text.

As a possible implementation, the target user includes multiple sub-users. The first obtaining module 601 is configured to: obtain multiple text blocks provided by each sub-user. The third generating module 606 is configured to: generate a sub-dataset corresponding to each sub-user based on the negative sample set and the positive sample set; combine the sub-datasets corresponding to respective sub-users to generate a candidate dataset; and perform deduplication processing on the candidate dataset based on a preset deduplication strategy to generate the dataset of the target user.

As a possible implementation, the recognizing module 607 is configured to: obtain a first query statement and a second query statement; encode the first query statement to generate a first query vector; encode the second query statement to generate a second query vector; and input the first query vector and the second query vector to the matching model to obtain a matching type outputted, and determine the text similarity between the first query statement and the second query statement based on the matching type.

As a possible implementation, the recognizing module 607 is configured to: obtain a first query statement and a second query statement; input the first query statement and the second query statement to the matching model for statement alignment to obtain an alignment result; and determine the text similarity between the first query statement and the second query statement based on the alignment result.

With the apparatus for processing the database according to embodiments of the present disclosure, the multiple text blocks provided by the target user are obtained. Each text block includes the multiple texts with similar semantics. The first text set meeting the preset similarity matching condition with the target text is obtained from the multiple text blocks. The second text set where each text does not belong to the same text block as the target text is obtained from the first text set. The negative sample set of the target text is generated based on the content of the text block to which each text in the second text set belongs. The positive sample set of the target text is generated based on the content of the target text block to which the target text belongs. The dataset of the target user is generated based on the negative sample set and the positive sample set. The matching model is trained based on the dataset for recognizing the text similarity. In this way, the technical problem that a false sample and simple data appear in random sampling is avoided. After the text set is obtained by the similarity matching condition, the positive sample set and the negative sample set are obtained for generating the dataset, thereby improving the validity of the dataset and the robustness of the matching model.

According to embodiments of the present disclosure, the present disclosure also provides an electronic device and a readable storage medium.

Figure 9:
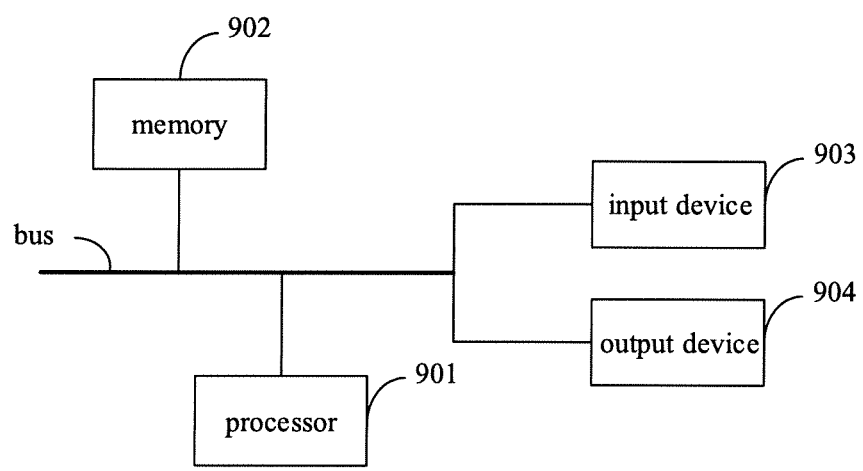
FIG. 9 is a block diagram illustrating an electronic device capable of implementing a method for processing a dataset according to embodiments of the present disclosure.

As illustrated in FIG. 9, FIG. 9 is a block diagram illustrating an electronic device capable of implementing a method for processing a dataset according to embodiments of the present disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, an intelligent phone, a wearable device and other similar computing device. The components, connections and relationships of the components, and functions of the components illustrated herein are merely examples, and are not intended to limit the implementation of the present disclosure described and/or claimed herein.

As illustrated in FIG. 9, the electronic device includes: one or more processors 901, a memory 902, and interfaces for connecting various components, including a high-speed interface and a low-speed interface. Various components are connected to each other by different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 9, a processor 901 is taken as an example.

The memory 902 is a non-transitory computer readable storage medium provided by the present disclosure. The memory is configured to store instructions executable by at least one processor, to enable the at least one processor to execute a method for processing a dataset provided by the present disclosure. The non-transitory computer readable storage medium provided by the present disclosure is configured to store computer instructions. The computer instructions are configured to enable a computer to execute the method for processing the dataset provided by the present disclosure.

As the non-transitory computer readable storage medium, the memory 902 may be configured to store non-transitory software programs, non-transitory computer executable programs and modules, such as program instructions/modules (such as, the first obtaining module 601, the second obtaining module 602, the third obtaining module 603, the first generating module 604, the second generating module 605, the third generating module 606, and the recognizing module 607 illustrated in FIG. 7) corresponding to the method for processing the dataset according to embodiments of the present disclosure. The processor 901 executes various functional applications and data processing of the server by operating non-transitory software programs, instructions and modules stored in the memory 902, that is, implements the method for processing the dataset according to the above method embodiment.

The memory 902 may include a storage program region and a storage data region. The storage program region may store an application required by an operating system and at least one function. The storage data region may store data created according to usage of the electronic device for processing the dataset. In addition, the memory 902 may include a high-speed random access memory, and may also include a non-transitory memory, such as at least one disk memory device, a flash memory device, or other non-transitory solid-state memory device. In some embodiments, the memory 902 may alternatively include memories remotely located to the processor 901, and these remote memories may be connected to the electronic device capable of implementing the method for processing the dataset via a network. Examples of the above network include, but are not limited to, an Internet, an intranet, a local area network, a mobile communication network and combinations thereof.

The electronic device capable of implementing the method for processing the dataset may also include: an input apparatus 903 and an output device 904. The processor 901, the memory 902, the input device 903, and the output device 904 may be connected via a bus or in other means. In FIG. 9, the bus is taken as an example.

The input device 903 may receive inputted digital or character information, and generate key signal input related to user setting and function control of the electronic device capable of implementing the method for processing the dataset, such as a touch screen, a keypad, a mouse, a track pad, a touch pad, an indicator stick, one or more mouse buttons, a trackball, a joystick and other input device. The output device 904 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components, or the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact via the communication network. A relationship between client and server is generated by computer programs operated on a corresponding computer and having a client-server relationship with each other.

With the technical solution according to embodiments of the present disclosure, the multiple text blocks provided by the target user are obtained. Each text block includes the multiple texts with similar semantics. The first text set meeting the preset similarity matching condition with the target text is obtained from the multiple text blocks. The second text set where each text does not belong to the same text block as the target text is obtained from the first text set. The negative sample set of the target text is generated based on the content of the text block to which each text in the second text set belongs. The positive sample set of the target text is generated based on the content of the target text block to which the target text belongs. The dataset of the target user is generated based on the negative sample set and the positive sample set. The matching model is trained based on the dataset for recognizing the text similarity. In this way, the technical problem that a false sample and simple data appear in random sampling is avoided. After the text set is obtained by the similarity matching condition, the positive sample set and the negative sample set are obtained for generating the dataset, thereby improving the validity of the dataset and the robustness of the matching model.

It should be understood that, steps may be reordered, added or deleted by utilizing flows in the various forms illustrated above. For example, the steps described in the present disclosure may be executed in parallel, sequentially or in different orders, so long as desired results of the technical solution disclosed in the present disclosure may be achieved, there is no limitation here.

The above detailed implementations do not limit the protection scope of the present disclosure. It should be understood by the skilled in the art that various modifications, combinations, sub-combinations and substitutions may be made based on design requirements and other factors. Any modification, equivalent substitution and improvement made within the spirit and the principle of the present disclosure shall be included in the protection scope of present disclosure.

What is claimed is:

1. A computer-implemented method for processing a dataset, comprising:
  obtaining a plurality of text blocks provided by a target user, each text block comprising a plurality of texts with similar semantics, and obtaining a first text set meeting a preset similarity matching condition with a target text from the plurality of text blocks;

obtaining a second text set from the first text set, wherein each text in the second text set does not belong to a same text block as the target text;

generating a negative sample set of the target text based on content of a candidate text block to which each text in the second text set belongs;

generating a positive sample set of the target text based on content of a target text block to which the target text belongs; and generating a dataset of the target user based on the negative sample set and the positive sample set, and training a matching model based on the dataset of the target user for recognizing a text similarity;

wherein the obtaining the first text set meeting the preset similarity matching condition with the target text from the plurality of text blocks comprises:

obtaining a sub-vector, a text vector and a position vector corresponding to the target text, and inputting the sub-vector, the text vector and the position vector corresponding to the target text into a preset training language representation model to obtain a target statement vector;

obtaining a sub-vector, a text vector and a position vector corresponding to each text in the plurality of text blocks, and inputting the sub-vector, the text vector and the position vector corresponding to each text into the preset training language representation model to obtain a statement vector corresponding to each text;

calculating a cosine similarity between the target statement vector and the statement vector corresponding to each text; and comparing the cosine similarity with a preset cosine threshold, and generating the first text set based on texts corresponding to cosine similarities greater than the preset cosine threshold.

2. The method of claim 1, wherein obtaining the first text set meeting the preset similarity matching condition with the target text from the plurality of text blocks comprises: performing word segmentation on the target text to generate a first word segmentation set, and performing word segmentation on respective texts in the plurality of text blocks to generate a plurality of second word segmentation sets; comparing the first word segmentation set with each set of the plurality of second word segmentation sets to obtain a word segmentation duplication between the first word segmentation set and each set of the plurality of second word segmentation sets; and comparing the word segmentation duplication between the first word segmentation set and each set of the plurality of second word segmentation sets with a preset threshold, and generating the first text set based on second word segmentation sets corresponding to word segmentation duplications greater than the preset threshold.

3. The method of claim 1, wherein before obtaining the second text set from the first text set, the method further comprises: obtaining a number of texts in the first text set, and determining whether the number of texts is greater than a preset number threshold; and in a case that the number of texts is greater than the preset number threshold, deleting one or more texts in the first text set based on the preset number threshold, such that the number of texts is equal to the preset number threshold.

4. The method of claim 1, wherein obtaining the second text set from the first text set comprises: obtaining a block identifier corresponding to the target text; obtaining a block identifier corresponding to each text in the first text set; and comparing the block identifier corresponding to each text with the block identifier corresponding to the target text, and generating the second text set based on one or more texts having inconsistent block identifiers with the target text.

5. The method of claim 1, wherein generating the negative sample set of the target text based on the content of the candidate text block to which each text in the second text set belongs comprises: obtaining the content of the candidate text block to which each text in the second text set belongs; performing text combination on a plurality of texts in each candidate text block to generate a first negative sample set; performing text combination on a plurality of texts in different candidate text blocks to generate a second negative sample set; and generating the negative sample set of the target text based on the first negative sample set and the second negative sample set.

6. The method of claim 1, wherein generating the positive sample set of the target text based on the content of the target text block to which the target text belongs comprises: obtaining the content of the target text block to which the target text belongs; and performing text combination on a plurality of texts in the target text block to generate the positive sample set of the target text.

7. The method of claim 1, wherein the target user comprises a plurality of sub-users, obtaining the plurality of text blocks provided by the target user comprises: obtaining a plurality of text blocks provided by each sub-user; and generating the dataset of the target user based on the negative sample set and the positive sample set comprises: generating a sub-dataset corresponding to each sub-user based on the negative sample set and the positive sample set; combining sub-datasets corresponding to respective sub-users to generate a candidate dataset; and performing deduplication processing on the candidate dataset based on a preset deduplication strategy to generate the dataset of the target user.

8. The method of claim 1, wherein training the matching model based on the dataset for recognizing the text similarity comprises: obtaining a first query statement and a second query statement; encoding the first query statement to generate a first query vector; encoding the second query statement to generate a second query vector; and inputting the first query vector and the second query vector to the matching model to obtain a matching type outputted, and determining the text similarity between the first query statement and the second query statement based on the matching type.

9. The method of claim 1, wherein training the matching model based on the dataset for recognizing the text similarity comprises: obtaining a first query statement and a second query statement; inputting the first query statement and the second query statement to the matching model for statement alignment to obtain an alignment result; and determining the text similarity between the first query statement and the second query statement based on the alignment result.

10. An apparatus for processing a dataset, comprising:
a processor; and
a memory, configured to store instructions executable by the processor, wherein the processor is configured to execute the instructions stored in the memory, so as to:
obtain a plurality of text blocks provided by a target user, each text block comprising a plurality of texts with similar semantics;
obtain a first text set meeting a preset similarity matching condition with a target text from the plurality of text blocks;

obtain a second text set from the first text set, wherein each text in the second text set does not belong to a same text block as the target text;
generate a negative sample set of the target text based on content of a candidate text block to which each text in the second text set belongs;
generate a positive sample set of the target text based on content of a target text block to which the target text belongs;
generate a dataset of the target user based on the negative sample set and the positive sample set; and
train a matching model based on the dataset of the target user for recognizing a text similarity;
obtain a sub-vector, a text vector and a position vector corresponding to the target text, and input the sub-vector, the text vector and the position vector corresponding to the target text into a preset training language representation model to obtain a target statement vector;
obtain a sub-vector, a text vector and a position vector corresponding to each text in the plurality of text blocks, and input the sub-vector, the text vector and the position vector corresponding to each text into the preset training language representation model to obtain a statement vector corresponding to each text;
calculate a cosine similarity between the target statement vector and the statement vector corresponding to each text; and
compare the cosine similarity with a preset cosine threshold, and generate the first text set based on texts corresponding to cosine similarities greater than the preset cosine threshold.

11. The apparatus of claim 10, wherein the processor is configured to: perform word segmentation on the target text to generate a first word segmentation set, and perform word segmentation on respective texts in the plurality of text blocks to generate a plurality of second word segmentation sets; compare the first word segmentation set with each set of the plurality of second word segmentation sets to obtain a word segmentation duplication between the first word segmentation set and each set of the plurality of second word segmentation sets; and compare the word segmentation duplication between the first word segmentation set and each set of the plurality of second word segmentation sets with a preset threshold, and generate the first text set based on second word segmentation sets corresponding to word segmentation duplications greater than the preset threshold.

12. The apparatus of claim 10, wherein the processor is further configured to: obtain a number of texts in the first text set, and to determine whether the number of texts is greater than a preset number threshold; and in a case that the number of texts is greater than the preset number threshold, delete one or more texts in the first text set based on the preset number threshold, such that the number of texts is equal to the preset number threshold.

13. The apparatus of claim 10, wherein the processor is configured to: obtain a block identifier corresponding to the target text; obtain a block identifier corresponding to each text in the first text set; and compare the block identifier corresponding to each text with the block identifier corresponding to the target text, and generate the second text set based on one or more texts having inconsistent block identifiers with the target text.

14. The apparatus of claim 10, wherein the processor is configured to: obtain the content of the candidate text block to which each text in the second text set belongs; perform text combination on a plurality of texts in each candidate text block to generate a first negative sample set; perform text combination on a plurality of texts in different candidate text blocks to generate a second negative sample set; and generate the negative sample set of the target text based on the first negative sample set and the second negative sample set.

15. The apparatus of claim 10, wherein the processor is configured to: obtain the content of the target text block to which the target text belongs; and perform text combination on a plurality of texts in the target text block to generate the positive sample set of the target text.

16. The apparatus of claim 10, wherein the target user comprises a plurality of sub-users, the processor is configured to: obtain a plurality of text blocks provided by each sub-user; generate a sub-dataset corresponding to each sub-user based on the negative sample set and the positive sample set; combine sub-datasets corresponding to respective sub-users to generate a candidate dataset; and perform deduplication processing on the candidate dataset based on a preset deduplication strategy to generate the dataset of the target user.

17. The apparatus of claim 10, wherein the processor is configured to: obtain a first query statement and a second query statement; encode the first query statement to generate a first query vector; encode the second query statement to generate a second query vector; and input the first query vector and the second query vector to the matching model to obtain a matching type outputted, and determine the text similarity between the first query statement and the second query statement based on the matching type.

18. The apparatus of claim 10, wherein the processor is configured to: obtain a first query statement and a second query statement; input the first query statement and the second query statement to the matching model for statement alignment to obtain an alignment result; and determine the text similarity between the first query statement and the second query statement based on the alignment result.

19. An electronic device, comprising:
at least one processor; and a memory, communicatively coupled to the at least one processor, wherein the memory is configured to store instructions executable by the at least one processor, and when the instructions are executed by the at least one processor, the at least one processor is caused to implement a method for processing a dataset, the method comprising:
obtaining a plurality of text blocks provided by a target user, each text block comprising a plurality of texts with similar semantics, and obtaining a first text set meeting a preset similarity matching condition with a target text from the plurality of text blocks;
obtaining a second text set from the first text set, wherein each text in the second text set does not belong to a same text block as the target text;
generating a negative sample set of the target text based on content of a candidate text block to which each text in the second text set belongs;
generating a positive sample set of the target text based on content of a target text block to which the target text belongs; and
generating a dataset of the target user based on the negative sample set and the positive sample set, and training a matching model based on the dataset of the target user for recognizing a text similarity;
wherein the obtaining the first text set meeting the preset similarity matching condition with the target text from the plurality of text blocks comprises:
obtaining a sub-vector, a text vector and a position vector corresponding to the target text, and inputting the sub-vector, the text vector and the position vector corresponding to the target text into a preset training language representation model to obtain a target statement vector;

obtaining a sub-vector, a text vector and a position vector corresponding to each text in the plurality of text blocks, and inputting the sub-vector, the text vector and the position vector corresponding to each text into the preset training language representation model to obtain a statement vector corresponding to each text;

calculating a cosine similarity between the target statement vector and the statement vector corresponding to each text; and comparing the cosine similarity with a preset cosine threshold, and generating the first text set based on texts corresponding to cosine similarities greater than the preset cosine threshold.

20. A non-transitory computer readable storage medium having computer instructions stored thereon, wherein the computer instructions are configured to cause a computer to execute a method for processing a dataset, the method comprising:

obtaining a plurality of text blocks provided by a target user, each text block comprising a plurality of texts with similar semantics, and obtaining a first text set meeting a preset similarity matching condition with a target text from the plurality of text blocks;

obtaining a second text set from the first text set, wherein each text in the second text set does not belong to a same text block as the target text;

generating a negative sample set of the target text based on content of a candidate text block to which each text in the second text set belongs;

generating a positive sample set of the target text based on content of a target text block to which the target text belongs; and generating a dataset of the target user based on the negative sample set and the positive sample set, and training a matching model based on the dataset of the target user for recognizing a text similarity;

wherein the obtaining the first text set meeting the preset similarity matching condition with the target text from the plurality of text blocks comprises:

obtaining a sub-vector, a text vector and a position vector corresponding to the target text, and inputting the sub-vector, the text vector and the position vector corresponding to the target text into a preset training language representation model to obtain a target statement vector;

obtaining a sub-vector, a text vector and a position vector corresponding to each text in the plurality of text blocks, and inputting the sub-vector, the text vector and the position vector corresponding to each text into the preset training language representation model to obtain a statement vector corresponding to each text;

calculating a cosine similarity between the target statement vector and the statement vector corresponding to each text; and comparing the cosine similarity with a preset cosine threshold, and generating the first text set based on texts corresponding to cosine similarities greater than the preset cosine threshold.

* * * * *